United States Patent
Huang et al.

(10) Patent No.: US 11,586,911 B2
(45) Date of Patent: Feb. 21, 2023

(54) PRE-TRAINING SYSTEM FOR SELF-LEARNING AGENT IN VIRTUALIZED ENVIRONMENT

(71) Applicant: Telefonaktiebolaget LM Ericsson (publ), Stockholm (SE)

(72) Inventors: Wei Huang, Sollentuna (SE); Wenfeng Hu, Täby (SE); Tobias Ley, Täby (SE); Martha Vlachou-Konchylaki, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 684 days.

(21) Appl. No.: 16/609,330

(22) PCT Filed: May 7, 2018

(86) PCT No.: PCT/EP2018/061716
§ 371 (c)(1),
(2) Date: Oct. 29, 2019

(87) PCT Pub. No.: WO2018/206504
PCT Pub. Date: Nov. 15, 2018

(65) Prior Publication Data
US 2020/0065673 A1    Feb. 27, 2020

Related U.S. Application Data

(60) Provisional application No. 62/504,269, filed on May 10, 2017.

(51) Int. Cl.
*G06N 3/00* (2006.01)
*G06N 3/08* (2023.01)
(Continued)

(52) U.S. Cl.
CPC ............. *G06N 3/08* (2013.01); *G06N 3/0454* (2013.01); *G06N 3/0472* (2013.01); *G06N 3/084* (2013.01); *G06N 3/105* (2013.01)

(58) Field of Classification Search
CPC ...... G06N 3/08; G06N 3/0454; G06N 3/0472; G06N 3/084; G06N 3/105; G06N 3/006; H04L 41/16
(Continued)

(56) References Cited

U.S. PATENT DOCUMENTS

2004/0073764 A1*  4/2004  Andreasson ........ G06F 12/0253
                                                  711/170
2010/0070439 A1*  3/2010  Takeuchi ............... G06N 20/00
                                                  706/12

(Continued)

OTHER PUBLICATIONS

Ghosh et al., "SAD-GAN: Synthetic Autonomous Driving using Generative Adversarial Networks," 30th Conference on Neural Information Processing Systems (NIPS2016), Barcelona, Spain, Nov. 27, 2016, 5 pages. (Year: 2016).*

(Continued)

*Primary Examiner* — Van D Huynh
(74) *Attorney, Agent, or Firm* — Sage Patent Group

(57) ABSTRACT

A pre-training apparatus and method for reinforcement learning based on a Generative Adversarial Network (GAN) is provided. GAN includes a generator and a discriminator. The method comprising receiving training data from a real environment where the training data includes a data slice corresponding to a first state-reward pair and a first state-action pair, training the GAN using the training data, training a relations network to extract a latent relationship of the first state-action pair with the first state-reward pair in a reinforcement learning context, causing the generator trained with training data to generate first synthetic data, processing a portion of the first synthetic data in the relations (Continued)

network to generate a resulting data slice, merging the second state-action pair portion of the first synthetic data with the second state-reward pair from the relations network to generate second synthetic data to update a policy for interaction with the real environment.

20 Claims, 12 Drawing Sheets

(51) Int. Cl.
  *G06N 3/04* (2023.01)
  *G06N 3/10* (2006.01)
  *G06N 3/084* (2023.01)
(58) Field of Classification Search
  USPC .......................................................... 706/25
  See application file for complete search history.

(56) References Cited

U.S. PATENT DOCUMENTS

| | | | | |
|---|---|---|---|---|
| 2016/0063992 | A1* | 3/2016 | Selfridge | G10L 15/22 704/254 |
| 2016/0283864 | A1* | 9/2016 | Towal | G06K 9/6272 |
| 2017/0228662 | A1* | 8/2017 | Gu | G06N 3/0427 |
| 2017/0337682 | A1* | 11/2017 | Liao | A61B 5/7267 |
| 2018/0121766 | A1* | 5/2018 | McCord | G06N 3/08 |
| 2018/0260700 | A1* | 9/2018 | Nagaraja | G06N 5/043 |
| 2019/0114559 | A1* | 4/2019 | Evans | G06F 11/004 |
| 2019/0205334 | A1* | 7/2019 | Kim | G06T 11/00 |

OTHER PUBLICATIONS

Arici et al., "Associative Adversarial Network," 30th Conference on Neural Information Processing Systems (NIPS 2016), Barcelona, Spain, Nov. 18, 2016, 8 pages. (Year: 2016).*
International Search Report and Written Opinion for PCT International Application No. PCT/EP2018/061716 dated Aug. 3, 2018.
Ghosh et al., "SAD-GAN: Synthetic Autonomous Driving using Generative Adversarial Networks," 30th Conference on Neural Information Processing Systems (NIPS 2016), Barcelona, Spain, Nov. 27, 2016, 5 pages.
Arici et al., "Associative Adversarial Network," 30th Conference on Neural Information Processing Systems (NIPS 2016), Barcelona, Spain, Nov. 18, 2016, 8 pages.
Huang et al., "Enhanced Experience Replay Generation for Efficient Reinforcement Learning," Retrieved from the Internet: URL:https://arxiv.org/pdf/1705.08245.pdf, May 23, 2017, 7 pages.
Hester et al., "Learning from Demonstrations for Real World Reinforcement Learning," Published in ArXiv 2017, Apr. 12, 2017, 11 pages.
Goodfellow et al., "Generative Adversarial Nets," Part of: Advances in Neural Information Processing Systems 27 (NIPS 2014), 9 pages.

* cited by examiner

PRE-TRAINING SYSTEM FOR SELF-LEARNING AGENT IN VIRTUALIZED ENVIRONMENT

CROSS REFERENCE TO RELATED APPLICATIONS

This application is a 35 U.S.C. § 371 national stage application of PCT International Application No. PCT/EP2018/061716, filed on May 7, 2018, which itself claims priority to U.S. Provisional Application No. 62/504,269 filed May 10, 2017, the disclosure and content of both of which are incorporated herein by reference in their entireties.

TECHNICAL FIELD

The present disclosure relates to a method and apparatus for self-learning systems, and in particular to a pre-training system for a self-learning agent in a virtualized environment.

BACKGROUND

Deploying virtual functions in the cloud, e.g., across a communications network such as the Internet, allows dynamic resource configurations, such as assigned CPU, RAM, and network bandwidth. Virtualization also enables dynamically adding and removing instances, making a snapshot of the whole system, testing of different configurations on separate network slices, etc. In general, virtualization gives flexibility in control and optimization of deployed network functions.

A self-learning system using artificial intelligent (AI) technologies such as deep reinforcement learning normally requires many training iterations. In particular, deep reinforcement learning requires a huge amount of data before it can reach reasonable performance. Performance during this learning is often very poor. Typically, these algorithms/agents learn good control polices only after many millions of steps of very poor performance during simulation. This situation may be acceptable when there is a perfectly accurate simulator. However, many real-world problems do not come with such an ideal simulator, thereby leaving the agent to learn in the real domain with real consequences for its decisions and actions. In other words, millions of poor decisions while the algorithm/agent is learning is not acceptable in real life situations or in when applied to real environments. This situation necessitates that the agent has good on-line performance from the start of learning in the real environment, which is a difficult task. In a physical system, the speed of data collection is limited. Thus, the training can be quite time consuming.

One proposed approach to address the poor initial performance is to pre-train the agent with data collected from the real environment to speed up the training. For example, the agent is pre-trained with demonstration data from the real environment such that the agent learns as much as possible from the demonstration data before running the agent on a real system. However, it is still unfeasible to collect a large amount of demonstration data in order to perform the pre-training. Also, this approach adds extra uncertainty margins for unseen state-actions in the decision making Therefore, this approach cannot accurately capture the characteristics of the environment.

SUMMARY

Some embodiments advantageously provide a method and system for pre-training a self-learning agent in a virtualized environment.

A pre-training system for reinforcement learning is provided. The system is based on Generative Adversarial Networks (GAN), but uses state-action pair relations to enhance the accuracy of the data for reinforcement learning, thereby creating a modified or enhanced GAN. The system described herein can also generate unlimited or vast amounts of realistic data once the network is trained.

According to a first aspect a method for reinforcement learning based on a Generative Adversarial Network (GAN) is presented, wherein the GAN including a generator and a discriminator. The method is performed by a pre-training apparatus and comprises receiving training data from a real environment, the training data including a data slice corresponding to a first state-reward pair and a first state-action pair; training the generator and discriminator using the training data; training a relations network to extract a latent relationship of the first state-action pair with the first state-reward pair in a reinforcement learning context; causing the generator trained with training data to generate first synthetic data; processing a portion of the first synthetic data in the relations network to generate a resulting data slice, the portion of first synthetic data corresponding to a second state-action pair, the resulting data slice corresponding to a second state-reward pair, the second state-action pair having a predefined relationship with the second state-reward pair; merging the second state-action pair portion of the first synthetic data with the second state-reward pair from the relations network to generate second synthetic data, the second synthetic data maintaining the predefined relationship between the second state-action pair and the second state-reward pair.

The relations network may further be a Deep Neural Network (DNN).

The method further comprises causing a policy for interaction with the real environment to be updated based on the second synthetic data.

The method further comprises training the generator using a difference between the first synthetic data and the second synthetic data.

The method further comprises causing the generator trained using the first synthetic data and the second synthetic data to generate third synthetic data.

The method further comprises causing a policy for interaction with the real environment to be updated based on the third synthetic data.

The method further comprises initializing the GAN with a plurality of random weight values; and initializing the relations network with another plurality of random weight values.

The method further comprises training generator and discriminator using the second synthetic data until the GAN converges or timeouts.

The method further comprises training generator and discriminator treating the second synthetic data as training data from the real environment.

According to a second aspect a pre-training apparatus for reinforcement learning based on a Generative Adversarial Network (GAN) is presented, wherein the GAN including a generator and a discriminator. The apparatus comprises processing circuitry configured to receive training data from a real environment, the training data including a data slice corresponding to a first state-reward pair and a first state-action pair; train the generator and discriminator using the training data; train a relations network to extract a latent relationship of the first state-action pair with the first state-reward pair in a reinforcement learning context; cause the generator trained with training data to generate first synthetic data; process a portion of the first synthetic data in the relations network to generate a resulting data slice, the portion of first synthetic data corresponding to a second state-action pair, the resulting data slice from the relations network corresponding to a second state-reward pair, the second state-action pair having a predefined relationship with the second state-reward pair; merge the second state-action pair portion of the first synthetic data with the second state-reward pair from the relations network to generate second synthetic data, the second synthetic data maintaining the predefined relationship between the second state-action pair and the second state-reward pair.

The relations network may further be a Deep Neural Network (DNN).

The apparatus may further comprise processing circuitry configured to cause a policy for interaction with the real environment to be updated based on the second synthetic data. According to a third aspect a pre-training apparatus for reinforcement learning based on a Generative Adversarial Network (GAN) is presented, wherein the GAN including a generator and a discriminator. The apparatus comprises means or first module for receiving training data from a real environment, the training data including a data slice corresponding to a first state-reward pair and a first state-action pair; means or second module for training the generator and discriminator using the training data; means or third module for training a relations network to extract a latent relationship of the first state-action pair with the first state-reward pair in a reinforcement learning context; means or fourth module for causing the generator trained with training data to generate first synthetic data; means or fifth module for processing a portion of the first synthetic data in the relations network to generate a resulting data slice, the portion of first synthetic data corresponding to a second state-action pair, the resulting data slice corresponding to a second state-reward pair, the second state-action pair having a predefined relationship with the second state-reward pair; means or sixth module for merging the second state-action pair portion of the first synthetic data with the second state-reward pair from the relations network to generate second synthetic data, the second synthetic data maintaining the predefined relationship between the second state-action pair and the second state-reward pair.

According to a fourth aspect a computer program reinforcement learning based on a Generative Adversarial Network (GAN) is presented, wherein the GAN including a generator and a discriminator. The computer program comprises computer program code which, when run on pre-training apparatus, causes the pre-training apparatus to perform the method above.

According to a fifth aspect a computer program product is presented. The computer program product comprises a computer program and a computer readable storage means on which the computer program is stored.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
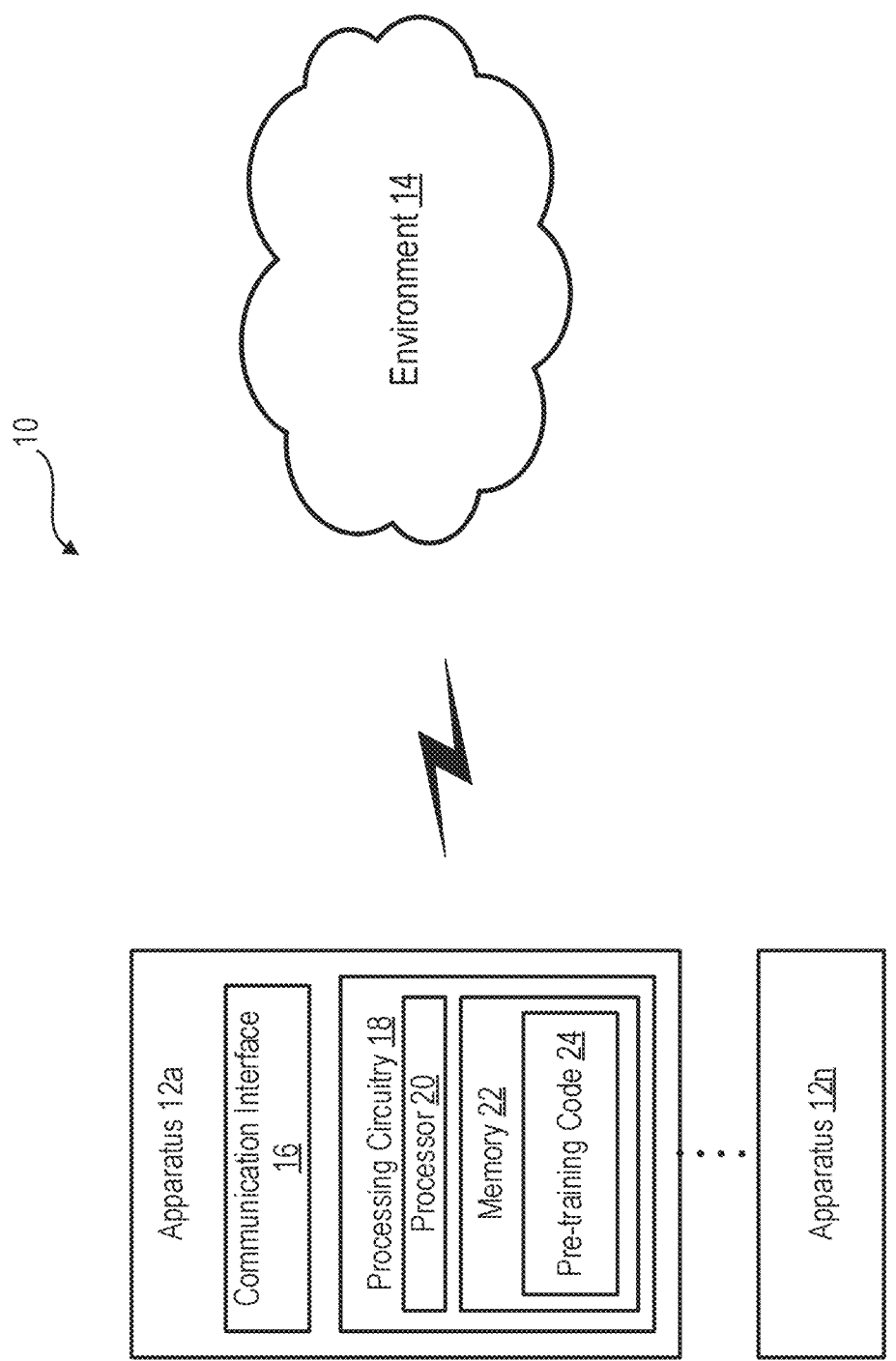
FIG. 1 is a block diagram of an example system for pre-training for self-learning in a virtualized environment in accordance with the principles of the disclosure.

Before describing in detail exemplary embodiments, it is noted that the embodiments reside primarily in combinations of apparatus components and processing steps related to a pre-training system for self-learning agent in virtualized environment. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In one or more embodiments of the disclosure, a pre-training system for reinforcement learning is provided. The pre-training system is based on a modified Generative Adversarial Network (GAN). In general, an unmodified GAN is an adversarial process that simultaneously trains two models: a generative model G (generator) that captures data distribution, and a discriminative model D (discriminator) that estimates the probability that a sample came from training data rather than the generator. The generator can be thought of as analogous to a group of counterfeiters trying to produce fake currency and use it without detection, while the discriminative model is analogous to the police, trying to detect the counterfeit currency. A goal of the adversarial process in GAN is to drive both the generator and discriminator to improve their methods until the counterfeits are indistinguishable from the genuine articles, i.e., until training data or real data is indistinguishable from synthesized data or data generated by the generator. In other words, ideally, the discriminator learns to capture distinguishing features of real data, which the generator learns to imitate, and the process iterates until real data and synthesized data are indistinguishable. However, in practice, GANs are well known for being challenging to train effectively. The relative model capacities of the generator and discriminator need to be carefully balanced in order for the generator to effective learn. Further, GANs lack an unambiguous and computable convergence criterion. For example, GAN relies on high dimensional data where each dimension has a specific distribution, but this high dimensional data lacks relationships among itself, thereby lacking a convergence criteria or relation to enforce on data generated by the GAN.

The disclosure modifies the GAN to create a modified or enhanced GAN to generate data, i.e., synthesized data, for pre-training for reinforcement learning. In particular, the modified GAN is based on the GAN described above, but uses state-action pair relations to enhance the accuracy of the data for reinforcement learning, i.e., creates and maintains predefined relations among pairs. Also, the modified GAN is advantageously able to generate vast amounts of realistic data once the network is trained. Therefore, implementing the modified GAN in the pre-training process advantageously provides a fast self-learning system with pre-training, accurate data for the learning agent, vast amounts of realistic data, and the capture of the multi-modal property of the data set.

Referring now to drawing figures in which like reference designators refer to like elements there is shown in FIG. 1 is a block diagram of an exemplary system for pre-training for self-learning in a virtualized environment in accordance with the principles of the disclosure, generally referred to as system "10". System 10 includes one or more pre-training apparatuses 12a-12n in communication with one or more environments 14 via one or more communication networks, paths and/or links using one or more communication protocols. In one or more embodiments environments 14 includes one or more real environments that generate one or more samples or data.

One or more apparatuses 12a-12n are referred to herein as "apparatus 12." In some embodiments apparatus 12 can be a computer, a server, a cloud-based computing system with distributed components and functions, a virtualized computing environment running on a computing device, etc. In other words, apparatus 12 is not limited to a single physical hardware box. Apparatus 12 includes communication interference 16 for communicating with environment 14 and other elements/entities in system 10. In one or more embodiments, communication interface 16 is replaced with or includes transmitter circuitry and/or receiver circuitry.

Apparatus 12 includes processing circuitry 18. Processing circuitry 18 includes processor 20 and memory 22. In addition to a traditional processor and memory, processing circuitry 18 may comprise integrated circuitry for processing and/or control, e.g., one or more processors and/or processor cores and/or FPGAs (Field Programmable Gate Array) and/or ASICs (Application Specific Integrated Circuitry). Processor 20 may be configured to access (e.g., write to and/or reading from) memory 22, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 22 may be configured to store code executable by processor 20 and/or other data, e.g., environment generated data, data pertaining to communications, e.g., configuration and/or address data of nodes, etc.

Processing circuitry 18 may be configured to control any of the methods and/or processes described herein and/or to cause such methods, signaling and/or processes to be performed, e.g., by apparatus 12. Processor 20 corresponds to one or more processors 20 for performing apparatus 12 functions described herein. Apparatus 12 includes memory 22 that is configured to store data, programmatic software code and/or other information described herein. In one or more embodiments, memory 22 is configured to store pre-training code 24. For example, pre-training code 24 includes instructions that, when executed by processor 20, causes processor 20 to perform the functions described herein such as the functions described with respect to FIGS. 4 and 5.

Figure 2:
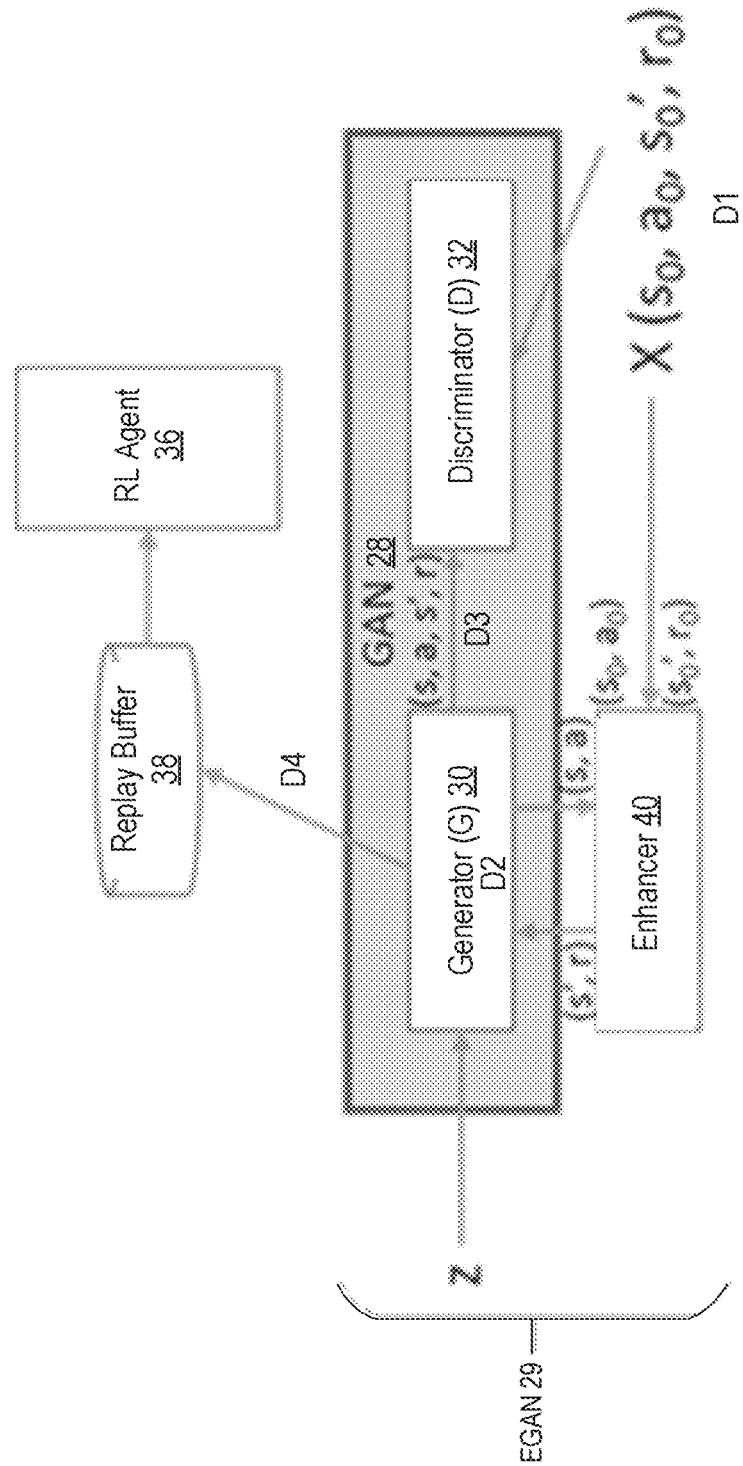
FIG. 2 is a function diagram of one example pre-training process performed in system using the enhanced GAN (EGAN) structure in accordance with the principles of the disclosure.

FIG. 2 is a function diagram of one example pre-training process performed in system 10 using the enhanced GAN (EGAN) 29 structure in accordance with the principles of the disclosure. In particular, FIG. 2 illustrates the functional architecture of the EGAN 29 which includes GAN 28 and enhancer 40. In FIG. 2, "Z" represents random variables that are input into generator. In one or more embodiments, Z is a multi-dimensional white noise term. Data such as training data is collected from environment 14 by following a policy of human or just a random policy to cover a broader data space. The GAN, i.e., modified or EGAN, generates realistic data set which cannot be distinguished by a discriminator. The GAN can be used for general data sets. In one or more embodiments, the data is collected from reinforcement learning environment. The data includes state, action, reward. The property of the data provides various advantages because there are fixed relations between state and {reward, action} pair for each environment. The generated data is constrained by this relation. In one or more embodiments, deep neural network (DNN) is added to learn this relation and enforce the data generated by the GAN to follow this relationship. In other words, some embodiments will implement a GAN without the added DNN, while in other embodiments the GAN and the DNN are implemented (DNN+GAN). The GAN trained as described herein is an enhanced or modified GAN.

With respect to FIG. 2, training data $D_1(s, a, s', r)$ is provided to GAN 28 and enhancer 40 for training. In one or more embodiments, training data $D_1(s, a, s', r)$ is real data. In one or more embodiments, enhancer includes a relations network such as DNN 34 (not illustrated) for learning the fixed relationship between state and {reward, action} pair for each environment, and forcing data generated by the EGAN 29 to follow this relationship. Generator 30 generates $D_2(s, a, s', r)$ and provides enhancer 40 with data slice $S_1(s, a)$. In one or more embodiments, batch of data $D_2(s, a, s', r)$ is first synthetic data. Enhancer 40 generates data slice $S_2(s', r)$ and feeds this back to generator 30. Generator 30 merges $S_1(s, a)$ and $S_2(s', r)$ to form a batch of data $D_3(s, a, s', r)$, i.e., second synthetic data. Generator 30 then generates a batch of data $D_4(s, a, s', r)$ and communicates this to RL agent 36 via replay buffer 38 for modifying policy and/or value functions using the batch of data $D_4(s, a, s', r)$, i.e., pre-training data. In one or more embodiments, batch of data $D_3(s, a, s', r)$ is used to update the policy or value of the network (S127). In one or more embodiments, the second synthetic data $D_3(s, a, s', r)$ can be treated as training data from the real environment. In one or more embodiments, the system is configured to initialize the GAN with a plurality of random weight values and initialize the relations network with another plurality of random weight values.

An algorithm for the processes illustrated in FIG. 2 is provided below in "Algorithm 1."

---

Algorithm 1: Data generation algorithm with EGAN

Data: Batch of quadruplets $D_r(s_t, a, s_{t+1}, r)$ from the real experience
Result: Unlimited experience replay samples $D_s(s_t, a, s_{t+1}, r)$ which can be used for the pre-training of the reinforcement learning agent
initialization:
/* initializes the for generator and discriminator networks in GAN, as well as the enhancer network */
training GAN:
/* training a GAN network with the real experience data $D_r(s_t, a, s_{t+1}, r)$ */
training enhancer;
/* training a enhancer network with the real experience data $D_r(s_t, a, s_{t+1}, r)$ to find the relations between $D_r(s_t, a)$ and $D_r(s_{t+1}, r)$ */
while convergence condition not met do
| generate data $D_s(s_t, a, s_{t+1}, r)$ with GAN:
| /* generate a test experience data set with GAN */
| improve GAN with enhancer;
| /* using the enhancer to calculate the discrepancy between $D_r(s_t, a)$
and
| $D_r(s_{t+1}, r)$ and use this to update GAN */
end
synthesized experience replay data generation;

---

In other words, the disclosure advantageously pre-trains RL agent 36 with synthesized data instead of vast amounts of real data. Further, the synthesized data/samples used for pre-training are higher quality samples than samples produced by modified GAN or EGAN, in part, due to the fixed/predefined relation between $S_1(s, a)$ and $S_2(s', r)$ that is maintained.

Figure 3A:
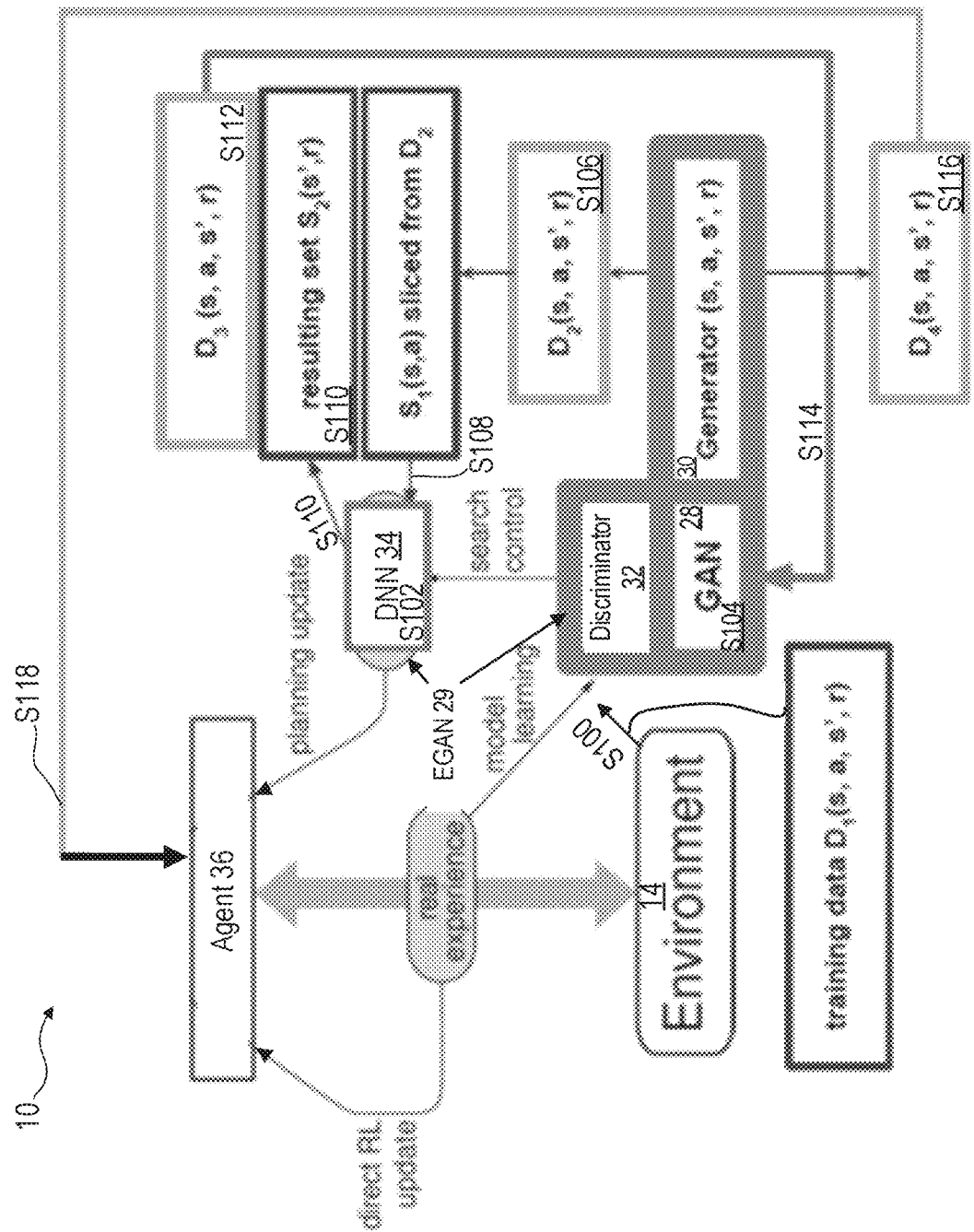
FIG. 3A is a function diagram of another example pre-training process performed in the system in accordance with the principles of the disclosure.

FIG. 3A is a function diagram of another example pre-training process performed in system 10 in accordance with the principles of the disclosure. In particular, FIG. 3A illustrates system 10 functional architecture. System 10 collects data from the environment by following a policy of human or just a random policy to cover a broader data space. The GAN, i.e., modified or EGAN, generates realistic data set which cannot be distinguished by a discriminator. The GAN can be used for general data sets. In one or more embodiments, the data is collected from reinforcement learning environment. The data includes state, action, reward. The property of the data provides various advantages because there are fixed relations between state and {reward, action} pair for each environment. The generated data is constrained by this relation. In one or more embodiments, deep neural network (DNN) is added to learn this relation and enforce the data generate by the GAN to follow this relationship. In other words, some embodiments will implement a GAN without the added DNN, while in other embodiments the GAN and the DNN are implemented (DNN+GAN). The GAN trained as described herein is an enhanced or modified GAN.

System 10 includes GAN 28 that includes generator 30 and discriminator 32. System 10 includes DNN 34, i.e., relations network. EGAN 29 includes DNN 34 and GAN 28. A batch of training data $D_1(s, a, s', r)$ is received from environment 14 (Block S100). For example, in one or more embodiments, a batch of quadruplets of data $D_1(s, a, s', r)$ is taken from a real experience in real environment 14. In one or more embodiments, the input batch, i.e., training data, is segmented into mini-batches. In one or more embodiments, $D_1(s, a, s', r)$ is a random sample from environment 14. Supervised learning is performed on DNN 34 with mini-batches of data $D_1(s, a, s', r)$ (Block S102).

Training data $D_1(s, a, s', r)$ from environment 14 is input into GAN 28 for training (Block S104). For example, in one or more embodiments, the training of GAN 28 includes training generator 30 and discriminator 32 with mini-batches of data $D_1(s, a, s', r)$. A batch of data $D_2(s, a, s', r)$, i.e., synthesized data, is generated via generator 30, where generator 30 was trained with $D_1(s, a, s', r)$ (Block S106). A data slice $S_1(s, a)$ of batch data $D_2$ is input into DNN 34 (Block S108). DNN 34 outputs a batch of data slices $S_2(s', r)$ (Block S110).

Figure 3B:
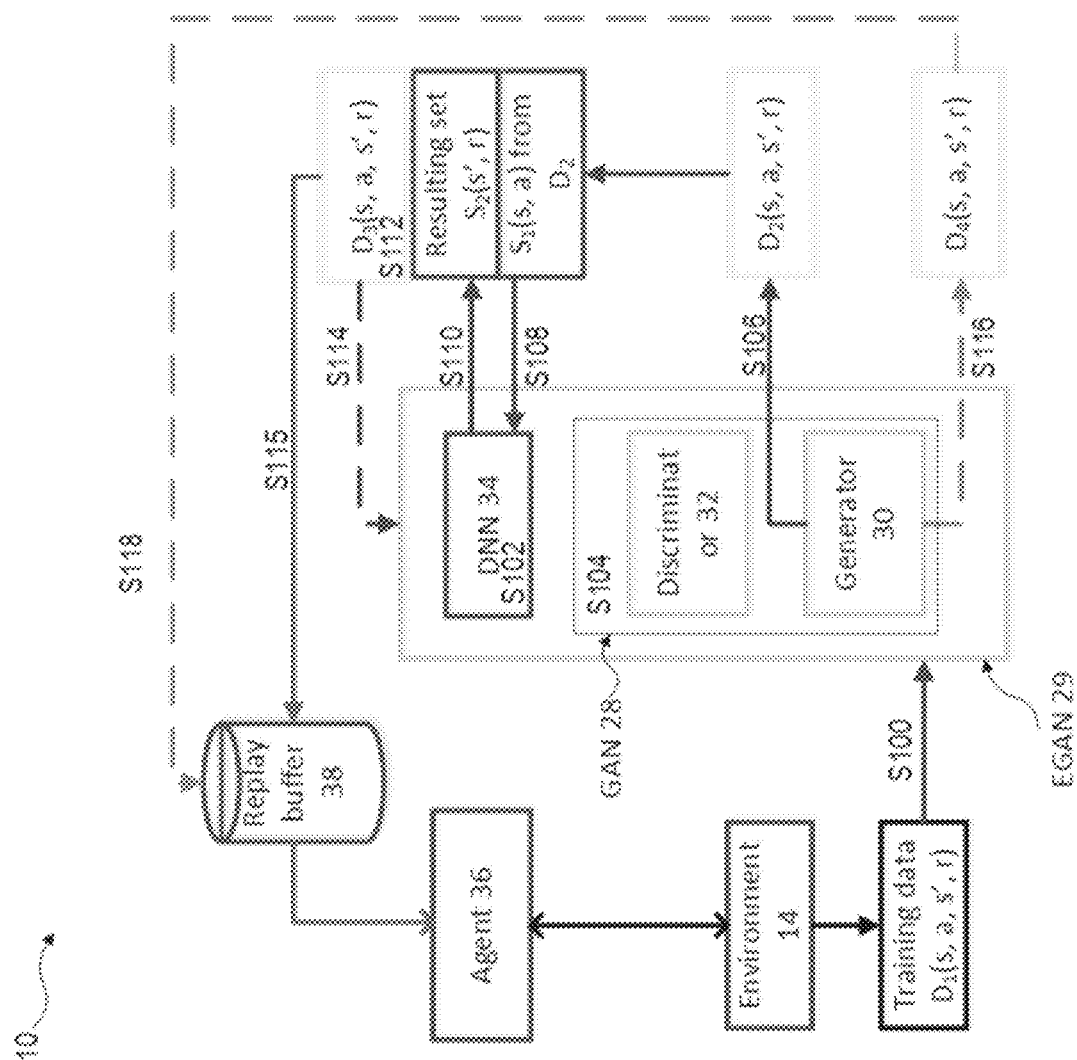
FIG. 3B is function diagram of another example pre-training process performed in the system in accordance with the principles of the disclosure.

$S_1(s, a)$ and $S_2(s', r)$ are merged to form a batch of $D_3(s, a, s', r)$, i.e., synthesized data (Block S112). Batch of data $D_3(s, a, s', r)$ is input into GAN 28 as real data for a training session (Block S114). In one or more embodiments, one or more of Blocks S106 to S114 are repeated until GAN 28 converges and/or times out. In one or more embodiments, Blocks S106 to S114 are part of an enhancement process for providing synthetic data, i.e., non-real data, for training GAN 28. In one or more embodiments, as shown in FIG. 3B, batch of data $D_3(s, a, s', r)$ is used to update the policy or value of the network (S115).

In the other embodiments, generator 30 of GAN 28 (which was trained with data $D_3(s, a, s', r)$ then generates a batch of data $D_4(s, a, s', r)$, i.e., synthesized data (Block S116). Batch of data $D_4(s, a, s', r)$ is used to update one or more policy and/or value functions of agent 36 (Block S118). In one or more embodiments, agent 36 is a reinforcement learning (RL) agent. In one embodiment, RL agent 36 implements and/or modifies policy and/or value functions using the pre-training data. In one or more embodiments, the second synthetic data $D_3(s, a, s', r)$ can be treated as training data from the real environment. In one or more embodiments, the system is configured to initialize the GAN with a plurality of random weight values and initialize the relations network with another plurality of random weight values.

In other words, the disclosure advantageously pre-trains RL agent 36 with synthesized data instead of vast amounts of real data. Further, the synthesized data/samples used for pre-training are higher quality samples than samples produced by modified GAN, in part, due to the fixed/predefined relation between $S_1(s, a)$ and $S_2(s', r)$ that is maintained.

An algorithm for the processes illustrated in FIG. 3A is provided below in "Algorithm 2."

---

Algorithm 2: Model-based Reinforcement Learning with DNN + GAN

/*Initialization*/
  Initialize a deep neural network DNN with random weights
  Initialize generative adversarial nets GAN with random weights
/*Data Input*/
  Take a batch of quadruplets D1(s,a,s',r) from the real experience
  Segment the input batch into mini matches if necessary
/*DNN Training*/
  Perform supervised learning on DNN with minibatches of D1 (s,a,s',r)
/*GAN Training*/
  Follow the training of generative adversarial nets (Goodfellow et al., 2014) to train generator G and discriminator D with minibatches of D1 (s,a,s',r)
/*DNN + GAN Loop*/
  Repeat
    Generate a batch of D2 (s,a,s',r) via the generator G
    Put as input a slide S1 (s,a) of the batch D2 into DNN
    Get as output a batch of S2 (s',r) from DNN
    Merge S1 (s,a) and S2 (s',r) to form a batch of D3 (s,a,s'r)
    Feed D3 (s,a,s'r) as real data into GAN for a training session
  Until GAN converges or timeout
/*Data Generation*/
  The generation part of the GAN generates a batch of data D4 (s,a,s',r)
  The batch is used to update the policy or value network

---

The pre-training procedure can be updated when more samples/data from the real environment become available.

Figure 4:
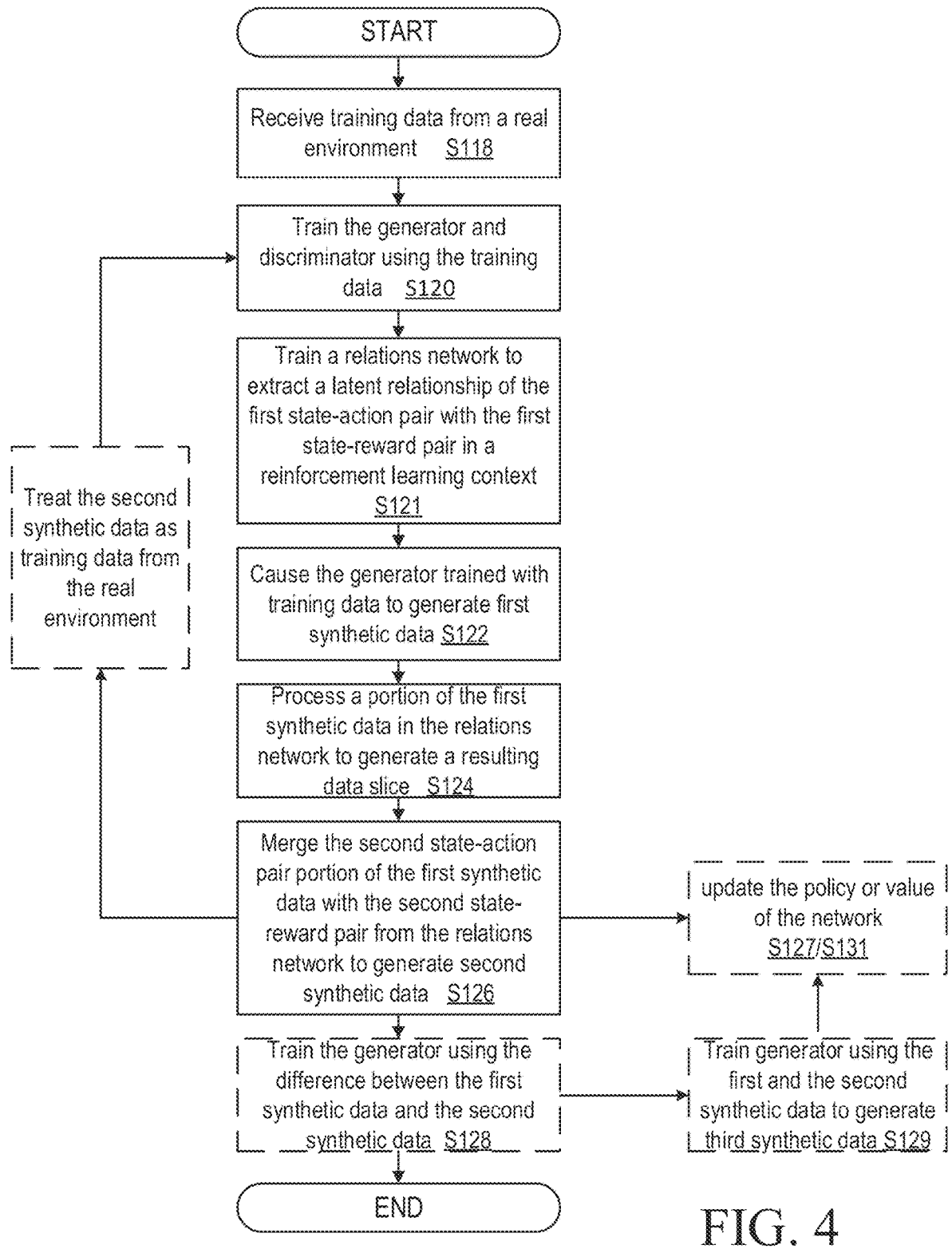
FIG. 4 is a flow diagram of an example pre-training process of pre-training code in accordance with the principles of the disclosure.

FIG. 4 is a flow diagram of an example pre-training process of pre-training code 24 in accordance with the principles of the disclosure. In particular, apparatus 12 is configured for reinforcement learning based on GAN 28, the GAN 28 including generator 30 and discriminator 32. Processing circuitry 18 is configured to receive training data from a real environment (Block S118). For example, in one or more embodiments, processing circuitry 18 receives one or more samples or training data from the real environment. In one or more embodiments, the training data includes state (s), action (a), transitioned to state (s') for choosing action (a), and reward (r) for choosing action (a) such that training data is written as D(s, a, s', r), e.g., $D_1(s, a, s', r)$. In one or more embodiments, the training data includes a data slice corresponding to a first state-reward pair and a first state-action pair.

Processing circuitry 18 is configured to train generator 30 and discriminator 32 using the training data (Block S120). In one or more embodiments, generator 30 and discriminator 32 are trained with minibatches or portions of training data, e.g., $D_1(s, a, s', r)$. In one or more embodiments, "minibatch" and "batch" refer to one or more samples or images of data, where a batch includes a plurality of minibatches. Processing circuitry 18 is configured to train a relations network to extract a latent relationship of the first state-action pair with the first state-reward pair in a reinforcement learning context (Block S121). Processing circuitry 18 is configured to cause generator 30 trained with training data to generate first synthetic data (Block S122). In one or more embodiments, generator 30 trained with minibatches of data $D_1(s, a, s', r)$ generates a batch of data $D_2(s, a, s', r)$.

Processing circuitry 18 is configured to process a portion of the first synthetic data, i.e., D2, in the relations network to generate a resulting data slice (Block S124). In one or more embodiments, the portion of first synthetic data corresponds to a second state-action pair (s, a), the resulting slice corresponds to a second state-reward pair (s', r), where the second state-action pair (s, a) has a predefined relationship with the second state-reward pair (s', r). In one or more embodiments, the relations network is a Deep Neural Network 34 (DNN 34) such that slice $S_1(s, a)$ of batch $D_2$ is input into DNN 34 to generate an output. In one or more embodiment, the output is a batch of $S_2(s', r)$ from DNN 34.

Processing circuitry 18 is configured to merge the second state-action pair portion of the first synthetic data with the second state-reward pair from the relations network to generate second synthetic data, i.e., D3 (Block S126). For example, in one or more embodiments, slice $S_1(s, a)$ is merged with $S_2(s', r)$ to form a batch of $D_3(s, a, s', r)$. In one or more embodiments, the second synthetic data maintains the predefined relationship between the second state-action pair (s, a) and the second state-reward pair (s', r). In one or more embodiments, batch of data $D_3(s, a, s', r)$ is used to update the policy or value of the network (S127). In another embodiment processing circuitry 18 is configured to train generator 30 using a difference between the first synthetic data and the second synthetic data (Block S128). For example, in one or more embodiments, $D_3(s, a, s', r)$ is input into GAN 28 as real data from environment 14 for a training session until GAN 28 converges or timeouts.

In one or more embodiments, generator 30 portion of GAN 28 that was trained using $D_3(s, a, s', r)$ generates a batch of data $D_4(s, a, s', r)$ (S129). In one or more embodiments, batch of data $D_4(s, a, s', r)$ is used to update the policy or value of the network (S131). In one or more embodiments, the system is configured to initialize the GAN with a plurality of random weight values and initialize the relations network with another plurality of random weight values.

Figure 5:
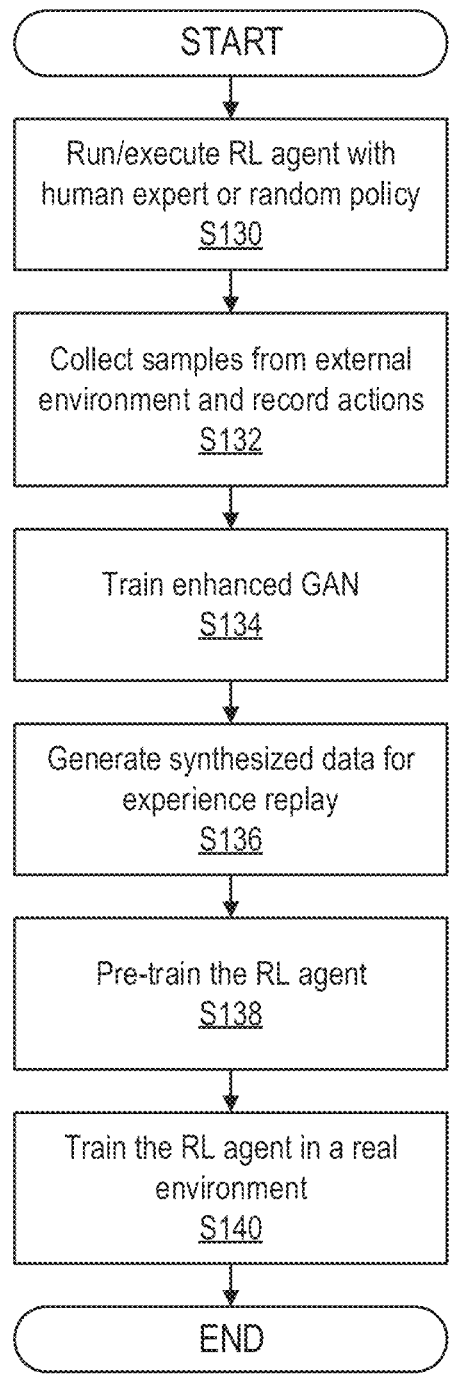
FIG. 5 is another embodiment of the pre-training process of pre-training code in accordance with the principles of the disclosure.

FIG. 5 is another embodiment of a pre-training process of pre-training code 24 in accordance with the principles of the disclosure. In some embodiments, processing circuitry 18 is configured to run or execute RL agent 36 with a human expert, i.e., under human supervision, or via a random policy (Block S130). Processing circuitry 18 is configured to collect samples from external environment 14 and record actions, as described herein (Block S132). Processing circuitry 18 is configured to train enhanced GAN 28, as described herein (Block S134). Processing circuitry 18 is configured to generate synthesized data for experience replay, as described herein (Block S136). Processing circuitry 18 is configured to pre-train RL agent 36, as described herein (Block S138). Processing circuitry 18 is configured to train RL agent 36 in a real environment 14 (Block S140).

Figure 6:
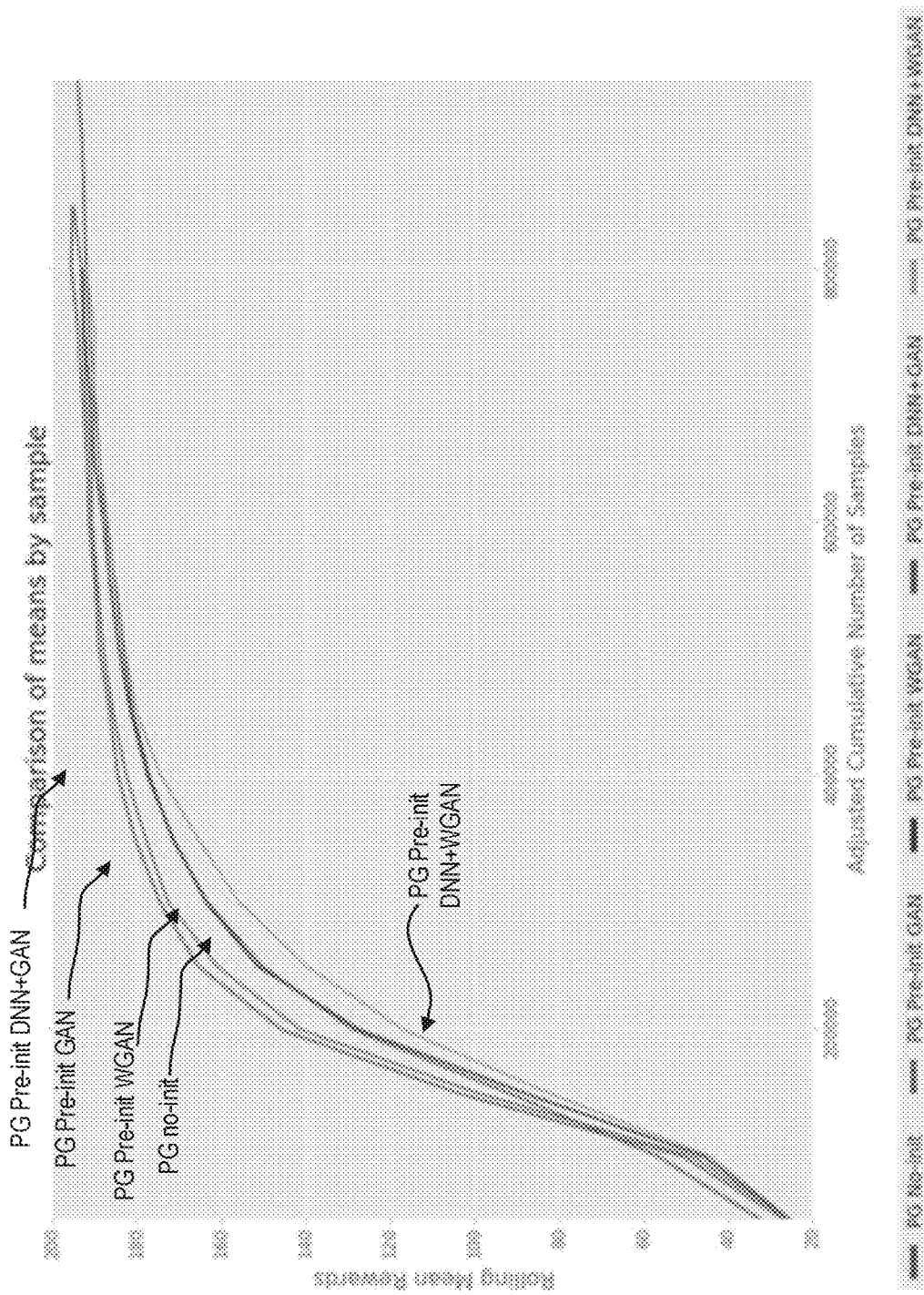
FIG. 6 is a graph comparing various agents where an adjusted cumulative number of samples is mapped versus a rolling mean of rewards.

FIG. 6 is a graph comparing various agents where an adjusted cumulative number of samples is mapped versus a rolling mean of rewards. As used herein, "PG" is a policy gradient, "No-init" stands for without pre-training, and "Pre-init" stands for without pre-training. "PG No-init" is the benchmark performance without pre-training or GAN, "PG Pre-init GAN" is the performance with pre-training and GAN, "PG Pre-init WGAN" is the performance with pre-training and WassersteinGAN, "PG Pre-init DNN+GAN" is the performance of one or more embodiment of the disclosure using the enhanced GAN, and "PG Pre-init DNN+ WGAN" is the performance with pre-training and DNN+ WassersteinGAN, which does not provide a good result when compared to the other agents.

The better performing agent will be the agent that provides a higher rolling mean rewards with fewer adjusted cumulative number of samples. As illustrated in FIG. 6, RL agent 36 trained using the methods described wherein, i.e., "PG Pre-init DNN+GAN", provides the highest rolling mean rewards when compared the other agents, given the same number of adjusted cumulative number of samples. WGAN refers to a different type or configured GAN than GAN 28 described herein.

Figure 7:
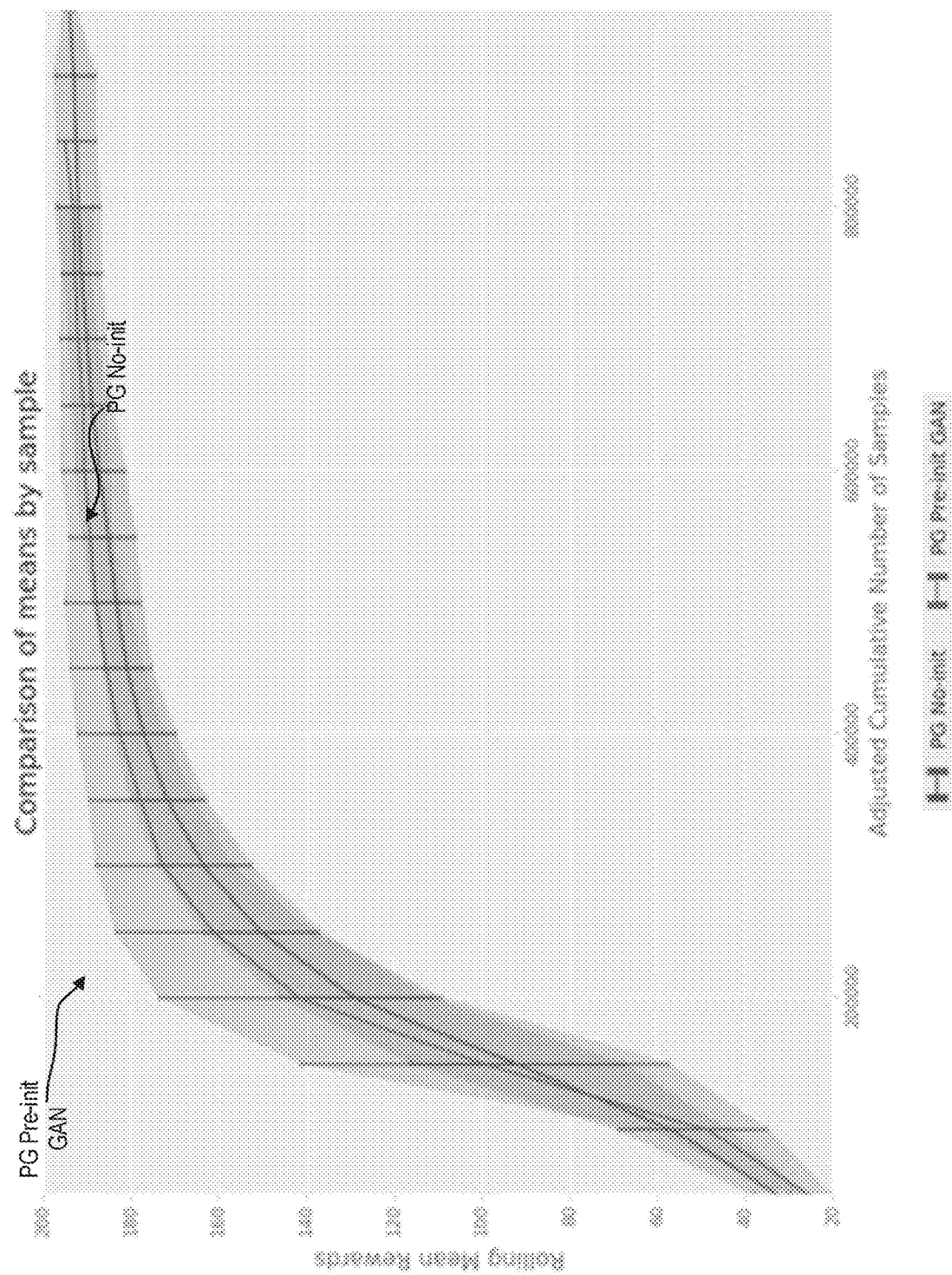
FIG. 7 is another graph comparing two agents, one of which was pre-trained using the GAN in accordance with the principles of the disclosure.
Figure 8A:
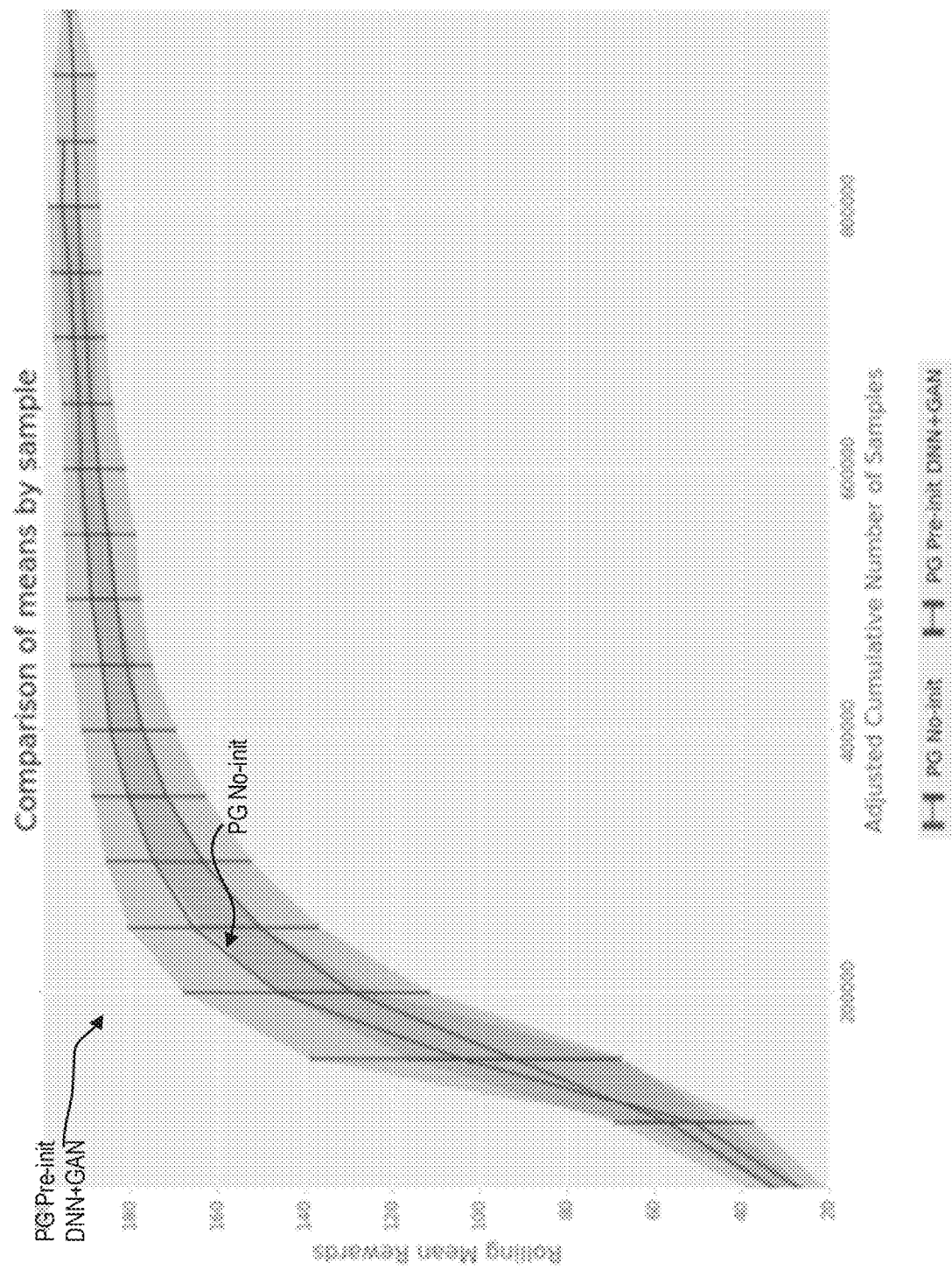
FIG. 8A is another graph comparing two agents, one of which was pre-trained using the EGAN in accordance with the principle of the disclosure.

FIG. 7 is another graph comparing two RL agents, one of which is RL agent 36 that was pre-trained using GAN 28 described herein, i.e., the "PG Pre-init GAN." As illustrated in FIG. 7, the arrangements described herein train RL agent 36 such that RL agent 36 is able to provide better performance after several samples than other arrangements. FIG. 8A is another graph comparing two RL agents, one of which is RL agent 36 that was pre-trained using GAN 28 described herein, i.e., the "PG Pre-init DNN+GAN." In particular, the approach described herein was tested with a control system for pole balancing. The results in FIG. 8A show clear sample efficiency with pre-trained system 10 described herein. The system with pre-training, described herein, i.e., system 10, uses approximately 30% less samples to reach the same reward level as the other system, even taking into account the samples used for pre-training. As illustrated in FIG. 8A, the arrangements described herein with respect to system 10 train RL agent 36 such that RL agent 36 is able to provide better performance after several samples, and even better performance than "PG Pre-init GAN" illustrated in FIG. 7.

Figure 8:
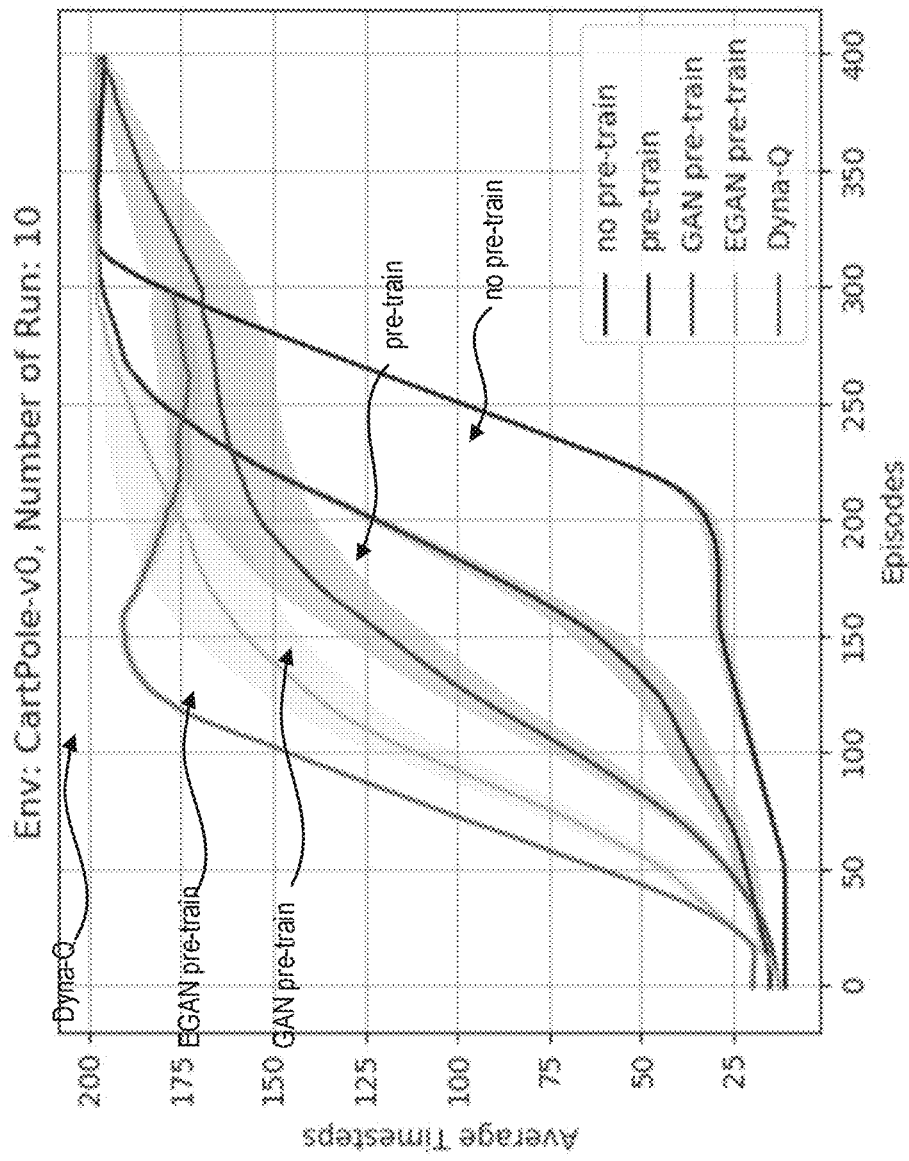
FIG. 8B is another graph comparing various agents, one of which was pre-trained using the EGAN in accordance with the principle of the disclosure.
FIG. 8C is another graph comparing various agents, one of which was pre-trained using the EGAN in accordance with the principle of the disclosure.
Figure 8:
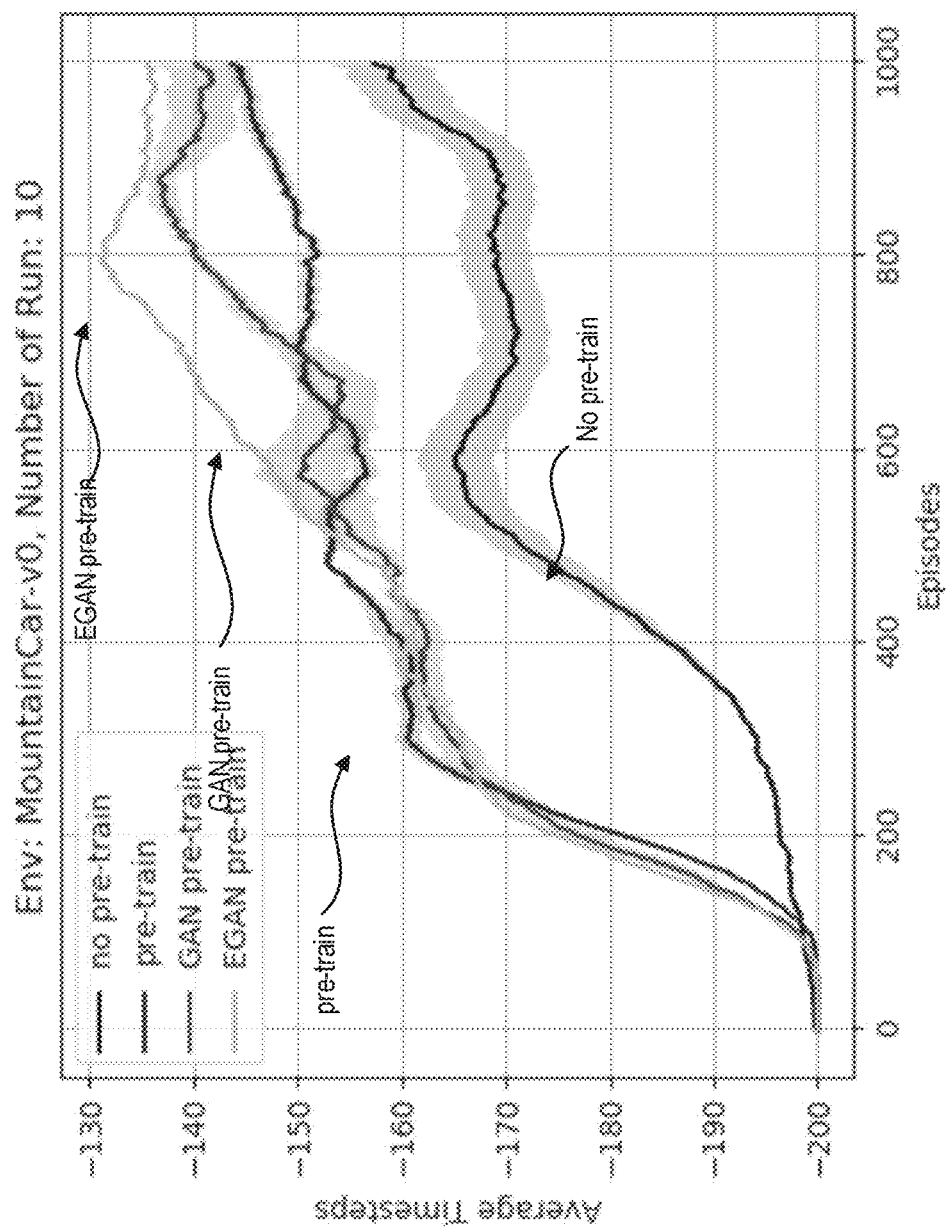

FIG. 8B is diagram to compare EGAN performance based on Q-learning algorithm which is different with the policy gradient algorithm used in FIG. 8. "EGAN pre-train" outperform "GAN pre-train", "pre-train" and "no pre-train" in terms of sample efficiency and beat "Dyna-Q" which is model-based RL algorithm in terms of end performance.

FIG. 8C is an experiment result on a different environment "MountainCar" and "EGAN pre-train" method also achieve best end performance.

Figure 9:
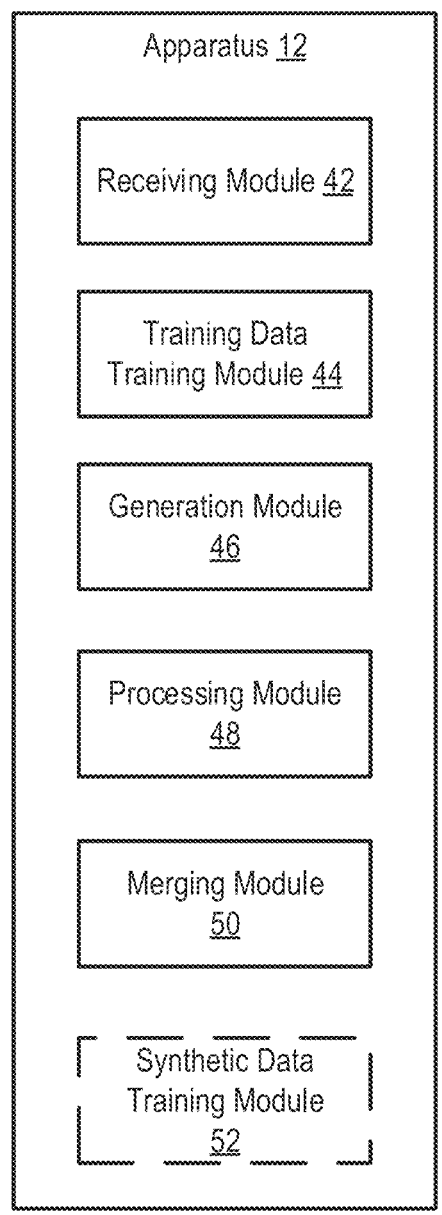
FIG. 9 is a block diagram of another embodiment of the apparatus in accordance with the principles of the disclosure.

FIG. 9 is block diagram of another embodiment of apparatus 12 in accordance with the principles of the disclosure. Apparatus 12 includes various modules/means that are configured to perform the pre-training process as described above with respect to pre-training code 24 as described with respect to FIGS. 4-5. For example, in one or more embodiments, apparatus 12 includes receiving module 42 that is configured to receive training data from a real environment. In one embodiment, the training data includes a data slice corresponding to a first state-reward pair and a first state-action pair. Further, apparatus 12 includes training data training module 44 that is configured to train the generator and discriminator using the training data. Training data training module 44 is also configured to train a relations network to extract a latent relationship of the first state-action pair with the first state-reward pair in a reinforcement learning context. Apparatus 12 includes generation module 46 that is configured to cause the generator trained with training data to generate first synthetic data. Apparatus 12 includes processing module 48 that is configured to process a portion of the first synthetic data in the relations network to generate a resulting data slice. The portion of first synthetic data corresponds to a second state-action pair. The resulting data slice from the relations network corresponds to a second state-reward pair. The second state-action pair has a predefined relationship with the second state-reward pair. Apparatus 12 includes a merging module 50 that is configured to merge the second state-action pair portion of the first synthetic data with the second state-reward pair from the relations network to generate second synthetic data. The second synthetic data maintains the predefined relationship between the second state-action pair and the second state-reward pair. Apparatus 12 includes synthetic data training module 52 that is configured to train the generator using a difference between the first synthetic data and the second synthetic data.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

The following are certain enumerated embodiments further illustrating various aspects the disclosed subject matter.

Embodiment 1

A pre-training apparatus for reinforcement learning based on a Generative Adversarial Network (GAN), the GAN including a generator and a discriminator, the apparatus comprising:
processing circuitry configured to:
receive training data from a real environment, the training data including a data slice corresponding to a first state-reward pair and a first state-action pair;
train the generator and discriminator using the training data;
train a relations network to extract a latent relationship of the first state-action pair with the first state-reward pair in a reinforcement learning context;
cause the generator trained with training data to generate first synthetic data;
process a portion of the first synthetic data in the relations network to generate a resulting data slice, the portion of first synthetic data corresponding to a second state-action pair, the resulting data slice from the relations network corresponding to a second state-reward pair, the second state-action pair having a predefined relationship with the second state-reward pair;
merge the second state-action pair portion of the first synthetic data with the second state-reward pair from the relations network to generate second synthetic data, the second synthetic data maintaining the predefined relationship between the second state-action pair and the second state-reward pair; and
train the generator using a difference between the first synthetic data and the second synthetic data.

Embodiment 2

The apparatus of Embodiment 1, wherein the relations network is a Deep Neural Network (DNN).

Embodiment 3

The apparatus of Embodiment 1, wherein the processing circuitry is further configured to cause the generator trained using the first synthetic data and the second synthetic data to generate third synthetic data.

Embodiment 4

The apparatus of Embodiment 3, wherein the processing circuitry is further configured to cause a policy for interaction with the real environment to be updated based on the third synthetic data.

Embodiment 5

The apparatus of Embodiment 1, wherein the processing circuitry is configured to:
initialize the GAN with a plurality of random weight values; and
initialize the relations network with another plurality of random weight values.

Embodiment 6

The apparatus of Embodiment 1, wherein the generator and discriminator are trained using the second synthetic data until the GAN one of converges and timeouts.

Embodiment 7

The apparatus of Embodiment 1, wherein the training of the generator and discriminator includes treating the second synthetic data as training data from the real environment.

Embodiment 8

A method for a pre-training apparatus for reinforcement learning based on a Generative Adversarial Network (GAN), the GAN including a generator and a discriminator, the method comprising:
receiving training data from a real environment, the training data including a data slice corresponding to a first state-reward pair and a first state-action pair;
training the generator and discriminator using the training data;
training a relations network to extract a latent relationship of the first state-action pair with the first state-reward pair in a reinforcement learning context;
causing the generator trained with training data to generate first synthetic data;
processing a portion of the first synthetic data in the relations network to generate a resulting data slice, the portion of first synthetic data corresponding to a second state-action pair, the resulting data slice corresponding to a second state-reward pair, the second state-action pair having a predefined relationship with the second state-reward pair;
merging the second state-action pair portion of the first synthetic data with the second state-reward pair from the relations network to generate second synthetic data, the second synthetic data maintaining the predefined relationship between the second state-action pair and the second state-reward pair; and training the generator using a difference between the first synthetic data and the second synthetic data.

Embodiment 9

The method of Embodiment 8, wherein the relations network is a Deep Neural Network (DNN).

Embodiment 10

The method of Embodiment 8, wherein the processing circuitry is further configured to cause the generator trained using the first synthetic data and the second synthetic data to generate third synthetic data.

Embodiment 11

The method of Embodiment 10, further comprising causing a policy for interaction with the real environment to be updated based on the third synthetic data.

Embodiment 12

The method of Embodiment 8, further comprising:
initializing the GAN with a plurality of random weight values; and
initializing the relations network with another plurality of random weight values.

Embodiment 13

The method of Embodiment 8, wherein the generator and discriminator are trained using the second synthetic data until the GAN one of converges and timeouts.

Embodiment 14

The method of Embodiment 8, wherein the training of the generator and discriminator includes treating the second synthetic data as training data from the real environment.

The invention claimed is:

1. A pre-training apparatus for reinforcement learning based on a Generative Adversarial Network (GAN), the GAN including a generator and a discriminator, the apparatus comprising:
processing circuitry configured to:
receive training data from a real environment, the training data including a data slice corresponding to a first state-reward pair and a first state-action pair;
train the generator and discriminator using the training data;
train a relations network to extract a latent relationship of the first state-action pair with the first state-reward pair in a reinforcement learning context;
cause the generator trained with the training data to generate first synthetic data;
process a portion of the first synthetic data in the relations network to generate a resulting data slice, the portion of the first synthetic data corresponding to a second state-action pair, the resulting data slice from the relations network corresponding to a second state-reward pair, the second state-action pair having a predefined relationship with the second state-reward pair; and
merge the second state-action pair portion of the first synthetic data with the second state-reward pair from the relations network to generate second synthetic data, the second synthetic data maintaining the predefined relationship between the second state-action pair and the second state-reward pair.

2. The apparatus of claim 1, wherein the relations network is a Deep Neural Network (DNN).

3. The apparatus of claim 1, wherein the processing circuitry is further configured to cause a policy for interaction with the real environment to be updated based on the second synthetic data.

4. The apparatus of claim 1, wherein the processing circuitry is further configured to train the generator using a difference between the first synthetic data and the second synthetic data.

5. The apparatus of claim 1, wherein the processing circuitry is further configured to cause the generator trained using the first synthetic data and the second synthetic data to generate third synthetic data.

6. The apparatus of claim 5, wherein the processing circuitry is further configured to cause a policy for interaction with the real environment to be updated based on the third synthetic data.

7. The apparatus of claim 1, wherein the processing circuitry is configured to:
initialize the GAN with a plurality of random weight values; and
initialize the relations network with another plurality of random weight values.

8. The apparatus of claim 1, wherein the generator and discriminator are trained using the second synthetic data until the GAN one of converges and timeouts.

9. The apparatus of claim 1, wherein the training of the generator and discriminator includes treating the second synthetic data as training data from the real environment.

10. A method for a pre-training apparatus for reinforcement learning based on a Generative Adversarial Network (GAN), the GAN including a generator and a discriminator, the method comprising:
receiving training data from a real environment, the training data including a data slice corresponding to a first state-reward pair and a first state-action pair;
training the generator and discriminator using the training data;
training a relations network to extract a latent relationship of the first state-action pair with the first state-reward pair in a reinforcement learning context;
causing the generator trained with training data to generate first synthetic data;
processing a portion of the first synthetic data in the relations network to generate a resulting data slice, the portion of the first synthetic data corresponding to a second state-action pair, the resulting data slice corresponding to a second state-reward pair, the second state-action pair having a predefined relationship with the second state-reward pair; and
merging the second state-action pair portion of the first synthetic data with the second state-reward pair from the relations network to generate second synthetic data, the second synthetic data maintaining the predefined relationship between the second state-action pair and the second state-reward pair.

11. The method of claim 10, wherein the relations network is a Deep Neural Network (DNN).

12. The method of claim 10, further comprising causing a policy for interaction with the real environment to be updated based on the second synthetic data.

13. The method of claim 10, further comprising training the generator using a difference between the first synthetic data and the second synthetic data.

14. The method of claim 10, further comprising causing the generator trained using the first synthetic data and the second synthetic data to generate third synthetic data.

15. The method of claim 14, further comprising causing a policy for interaction with the real environment to be updated based on the third synthetic data.

16. The method of claim 10, further comprising:
initializing the GAN with a plurality of random weight values; and
initializing the relations network with another plurality of random weight values.

17. The method of claim 10, wherein the generator and discriminator are trained using the second synthetic data until the GAN one of converges and timeouts.

18. The method of claim 10, wherein the training of the generator and discriminator includes treating the second synthetic data as training data from the real environment.

19. A pre-training apparatus for reinforcement learning based on a Generative Adversarial Network (GAN), the GAN including a generator and a discriminator, the pre-training apparatus comprising:
means for receiving training data from a real environment, the training data including a data slice corresponding to a first state-reward pair and a first state-action pair;
means for training the generator and discriminator using the training data;
means for training a relations network to extract a latent relationship of the first state-action pair with the first state-reward pair in a reinforcement learning context;
means for causing the generator trained with training data to generate first synthetic data;
means for processing a portion of the first synthetic data in the relations network to generate a resulting data slice, the portion of the first synthetic data corresponding to a second state-action pair, the resulting data slice corresponding to a second state-reward pair, the second state-action pair having a predefined relationship with the second state-reward pair; and
means for merging the second state-action pair portion of the first synthetic data with the second state-reward pair from the relations network to generate second synthetic data, the second synthetic data maintaining the predefined relationship between the second state-action pair and the second state-reward pair.

20. A pre-training apparatus for reinforcement learning based on a Generative Adversarial Network (GAN), the GAN including a generator and a discriminator, the pre-training apparatus comprising:
first module for receiving training data from a real environment, the training data including a data slice corresponding to a first state-reward pair and a first state-action pair;
second module for training the generator and discriminator using the training data and training a relations network to extract a latent relationship of the first state-action pair with the first state-reward pair in a reinforcement learning context;
fourth module for causing the generator trained with training data to generate first synthetic data;
fifth module for processing a portion of the first synthetic data in the relations network to generate a resulting data slice, the portion of the first synthetic data corresponding to a second state-action pair, the resulting data slice corresponding to a second state-reward pair, the second state-action pair having a predefined relationship with the second state-reward pair; and
sixth module for merging the second state-action pair portion of the first synthetic data with the second state-reward pair from the relations network to generate second synthetic data, the second synthetic data maintaining the predefined relationship between the second state-action pair and the second state-reward pair.

\* \* \* \* \*